United States Patent
Shen et al.

(10) Patent No.: US 9,246,838 B1
(45) Date of Patent: Jan. 26, 2016

(54) LABEL SWITCHED PATH SETUP USING FAST REROUTE BYPASS TUNNEL

(75) Inventors: Yimin Shen, Shrewsbury, MA (US); Rahul Aggarwal, San Francisco, CA (US); Nitin Bahadur, Santa Clara, CA (US); Harish Sitaraman, Waltham, MA (US); Disha Chopra, Fremont, CA (US); Nischal Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 561 days.

(21) Appl. No.: 13/118,116

(22) Filed: May 27, 2011

(51) Int. Cl.
*H04L 12/911* (2013.01)
*H04L 12/751* (2013.01)
*H04L 12/54* (2013.01)

(52) U.S. Cl.
CPC ............. *H04L 47/70* (2013.01); *H04L 12/5689* (2013.01); *H04L 45/02* (2013.01); *H04L 45/08* (2013.01); *H04L 47/746* (2013.01); *H04L 47/825* (2013.01)

(58) Field of Classification Search
CPC ..... H04L 12/5695; H04L 47/15; H04L 45/02; H04L 47/70; H04L 45/08; H04L 47/825; H04L 47/746; H04L 12/5689
USPC .......................... 370/228, 235, 221, 218, 225
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,477,166 B1 | 11/2002 | Sanzi et al. | |
| 6,493,349 B1 | 12/2002 | Casey | |
| 6,501,754 B1 | 12/2002 | Ohba et al. | |
| 6,553,028 B1 | 4/2003 | Tang et al. | |
| 6,597,703 B1 | 7/2003 | Li et al. | |
| 6,611,528 B1 | 8/2003 | Farinacci et al. | |
| 6,625,773 B1 | 9/2003 | Boivie et al. | |
| 6,731,652 B2 | 5/2004 | Ramfelt et al. | |
| 6,751,218 B1 | 6/2004 | Hagirahim et al. | |

(Continued)

FOREIGN PATENT DOCUMENTS

| | | | |
|---|---|---|---|
| JP | 2005130258 A | 5/2005 | |
| JP | 2005167482 A | 6/2005 | |

(Continued)

OTHER PUBLICATIONS

Pan et al., "Fast Reroute Extensions to RSVP-TE for LSP Tunnels," RFC 4090, May 2005, 36 pp.

(Continued)

*Primary Examiner* — Alpus H Hsu
*Assistant Examiner* — Anthony Luo
(74) *Attorney, Agent, or Firm* — Shumaker & Sieffert, P.A.

(57) ABSTRACT

A label switched path (LSP) is established within a network using an MPLS fast reroute bypass tunnel when a resource along a primary path of the LSP has failed but is protected by the MPLS fast reroute bypass tunnel. While establishing the LSP, a network device identifies a failed resource along a primary path of the LSP. In response to identifying the failed resource, the network device determines whether a bypass tunnel exists from the network device to a node along the primary path, wherein the bypass tunnel avoids the failed resource. Upon determining that the bypass tunnel exists, the network device tunnels a message for establishing the LSP to the node over the bypass tunnel.

19 Claims, 4 Drawing Sheets

(56) References Cited

U.S. PATENT DOCUMENTS

| | | |
|---|---|---|
| 6,778,531 B1 | 8/2004 | Kodialam et al. |
| 6,807,182 B1 | 10/2004 | Dolphin et al. |
| 6,847,645 B1 | 1/2005 | Potter et al. |
| 6,879,594 B1 | 4/2005 | Lee et al. |
| 6,920,503 B1 | 7/2005 | Nanji et al. |
| 6,976,154 B1 | 12/2005 | Dyckerhoff et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,251,218 B2 | 7/2007 | Jorgensen |
| 7,269,135 B2 | 9/2007 | Frick et al. |
| 7,281,058 B1 | 10/2007 | Shepherd et al. |
| 7,330,468 B1 | 2/2008 | Tse-Au |
| 7,333,491 B2 | 2/2008 | Chen et al. |
| 7,345,991 B1* | 3/2008 | Shabtay et al. ............... 370/221 |
| 7,359,328 B1 | 4/2008 | Allan |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,420,989 B2* | 9/2008 | Liu et al. ...................... 370/468 |
| 7,447,150 B1* | 11/2008 | Sylvain ......................... 370/218 |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,532,624 B2 | 5/2009 | Ikegami et al. |
| 7,545,735 B1 | 6/2009 | Shabtay et al. |
| 7,558,199 B1 | 7/2009 | Minei et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,567,512 B1 | 7/2009 | Minei et al. |
| 7,570,604 B1 | 8/2009 | Aggarwal et al. |
| 7,570,605 B1 | 8/2009 | Aggarwal et al. |
| 7,590,115 B1 | 9/2009 | Aggarwal et al. |
| 7,602,702 B1 | 10/2009 | Aggarwal |
| 7,606,235 B1 | 10/2009 | Ayyangar et al. |
| 7,633,958 B2* | 12/2009 | Chen et al. ..................... 370/401 |
| 7,742,482 B1 | 6/2010 | Aggarwal |
| 7,787,380 B1 | 8/2010 | Aggarwal et al. |
| 7,830,787 B1 | 11/2010 | Wijnands et al. |
| 7,839,862 B1 | 11/2010 | Aggarwal |
| 7,860,104 B1 | 12/2010 | Aggarwal |
| 7,933,267 B1 | 4/2011 | Aggarwal et al. |
| 7,936,780 B1 | 5/2011 | Kompella |
| 7,940,698 B1 | 5/2011 | Minei |
| 8,072,879 B2* | 12/2011 | Vasseur et al. ................ 370/225 |
| 8,077,726 B1* | 12/2011 | Kumar et al. ............. 370/395.31 |
| 8,121,126 B1* | 2/2012 | Moisand et al. .............. 370/392 |
| 8,165,032 B1* | 4/2012 | Hanif et al. ................... 370/248 |
| 8,264,962 B2* | 9/2012 | Vasseur et al. ................ 370/235 |
| 8,339,973 B1* | 12/2012 | Pichumani et al. ........... 370/248 |
| 8,565,098 B2* | 10/2013 | Liu et al. ....................... 370/242 |
| 2002/0071390 A1 | 6/2002 | Reeves et al. |
| 2002/0109879 A1 | 8/2002 | Wing So |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099218 A1 | 5/2003 | Tillotson |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0210705 A1 | 11/2003 | Seddigh et al. |
| 2004/0037279 A1 | 2/2004 | Zelig et al. |
| 2004/0042406 A1 | 3/2004 | Wu et al. |
| 2004/0047342 A1 | 3/2004 | Gavish et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0213160 A1 | 10/2004 | Regan et al. |
| 2004/0218536 A1 | 11/2004 | Yasukawa et al. |
| 2004/0240446 A1 | 12/2004 | Compton et al. |
| 2005/0001720 A1 | 1/2005 | Mason et al. |
| 2005/0013295 A1 | 1/2005 | Regan et al. |
| 2005/0018693 A1 | 1/2005 | Dull |
| 2005/0025156 A1 | 2/2005 | Smathers |
| 2005/0027782 A1 | 2/2005 | Jalan et al. |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0129001 A1 | 6/2005 | Backman et al. |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2007/0036162 A1 | 2/2007 | Tingle et al. |
| 2007/0076709 A1 | 4/2007 | Mattson et al. |
| 2007/0098003 A1 | 5/2007 | Boers et al. |
| 2007/0104119 A1 | 5/2007 | Sarkar et al. |
| 2007/0124454 A1 | 5/2007 | Watkinson |
| 2007/0140107 A1 | 6/2007 | Eckert et al. |
| 2008/0056258 A1 | 3/2008 | Sharma et al. |
| 2008/0123524 A1 | 5/2008 | Vasseur et al. |
| 2008/0123654 A1 | 5/2008 | Tse-Au |
| 2008/0170493 A1 | 7/2008 | Vasseur |
| 2008/0291921 A1 | 11/2008 | Du et al. |
| 2009/0028149 A1 | 1/2009 | Yasukawa et al. |
| 2009/0296568 A1 | 12/2009 | Kitada |
| 2010/0008222 A1 | 1/2010 | Le Roux et al. |
| 2010/0020679 A1 | 1/2010 | Decraene et al. |
| 2011/0199891 A1* | 8/2011 | Chen ............................. 370/218 |

FOREIGN PATENT DOCUMENTS

| | | |
|---|---|---|
| JP | 2005252385 A | 9/2005 |
| KR | 2004001206 | 1/2004 |
| WO | 02/091670 A2 | 11/2002 |
| WO | 2004/071032 A1 | 8/2004 |

OTHER PUBLICATIONS

Awduche et al., RFC 3209, "RSVP-TE: Extensions to RSVP for LSP Tunnels," Network Working Group, Dec. 2001, 57 pgs.

Awduche et al., "RSVP-TE: Extensions to RSVP for LSP Tunnels," IETF, Dec. 2001, pp. 1-57.

RSVP-TE: Resource Reservation Protocol—Traffic Extension, Javvin Company, 2 pgs, printed Apr. 18, 2005. http://www.javvin.com/protocolRSVPTE.html.

Zhang, "A Destination-initiated Multicast Routing Protocol for Shortest Path Tree Constructions," GLOBECOM 2003, IEEE Global Telecommunications Conference, XP010677629, pp. 2840-2844.

Rosen et al., "Multicast in MPLS/BGP IP VPNs," draft-rosen-vpn-mcast-07.txt, May 2004, 27 pgs.

(56) References Cited

OTHER PUBLICATIONS

Deering et al., "Protocol Independent Multicast-Sparse Mode (PIM-SM): Motivation and Architecture," draft-ietf-idmr-pim-arch-05.txt, Aug. 4, 1998, 30 pgs.
Martini et al., "Transport of Layer 2 Frames Over MPLS," Network Working Group Internet Draft, draft-martini-l2circuit-trans-mpls-08.txt, Nov. 2001, 18 pgs.
Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.
Aggarwal et al., "MPLS Upstream Label Assignment and Context Specific Label Space," Network Working Group Internet Draft, draft-raggarwa-mpls-upstream-label-00.txt, Jan. 2005, 9 pp.
Wijnands et al., "Multicast Extensions for LDP," Network Working Group Internet Draft, draft-wijnands-mpls-ldp-mcast-ext-00.txt, Mar. 2005, 13 pp.
Aggarwal et al., "Establishing Point to Multipoint MPLS TE LSPs," IETF, Aug. 2004, 15 pp.
Yasukawa et al., "Requirements for Point to Multipoint extension to RSVP-TE," IETF, Oct. 2003, pp. 1-20.
Atlas et al., "MPLS RSVP-TE Interoperability for Local Protection/Fast Reroute," IETF, Jul. 2001, pp. 1-14.
Le Roux et al., "Fast Reroute in MPLS L3VPN networks Towards CE-to-CE Protection," www.mpls2006.com, 2006, 24 pgs.
Satyanarayana et al., "Extensions to GMPLS RSVP Graceful Restart", draft-aruns-ccamp-restart-ext-01.txt, Jul. 2004, Network Working Group Internet Draft, 23 pp.
Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.
U.S. Appl. No. 11/213,640 by Rahul Aggarwal, filed Aug. 26, 2005.
U.S. Appl. No. 12/423,640 by Rahul Aggarwal, filed Apr. 14, 2009.
U.S. Appl. No. 12/427,542 by Rahul Aggarwal, filed Apr. 21, 2009.
U.S. Appl. No. 12/469,075 by Rahul Aggarwal, filed May 20, 2009.
U.S. Appl. No. 12/497,078 by Rahul Aggarwal, filed Jul. 2, 2009.
U.S. Appl. No. 12/497,957 by Rahul Aggarwal, filed Jul. 6, 2009.
U.S. Appl. No. 12/497,939 by Rahul Aggarwal, filed Jul. 6, 2009.
U.S. Appl. No. 12/574,428, by Rahul Aggarwal, filed Oct. 6, 2009.
U.S. Appl. No. 11/192,432, by Rahul Aggarwal, filed Jul. 28, 2005.
U.S. Appl. No. 12/871,784, by Rahul Aggarwal, filed Aug. 30, 2010.
U.S. Appl. No. 12/972,197, by Rahul Aggarwal, filed Dec. 17, 2010.
U.S. Appl. No. 12/951,885, by Rahul Aggarwal, filed Nov. 22, 2010.
U.S. Appl. No. 12/391,859, by Nitin Kumar, filed Feb. 24, 2009.
U.S. Appl. No. 12/425,503, by Hannes Gredler, filed Apr. 17, 2009.

\* cited by examiner

LABEL SWITCHED PATH SETUP USING FAST REROUTE BYPASS TUNNEL

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link, including peering links, may approach a maximum bandwidth capacity for the link, thereby leading to congestion and loss.

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of the LSP are commonly known as ingress routers, while routers at the tail-end of the LSP are commonly known as egress routers. Ingress and egress routers, as well as intermediate routers along the LSP that support MPLS, are more generally referred to as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with standard routing protocols.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In some instances, a node or link along an LSP may no longer be available. For example, a link along the LSP, or a node may experience a failure event, such as when one or more components of a router fail or the router is brought down by a user, such as a network operator. In these instances, signaling of a new LSP would fail when the LSP was to be explicitly routed along a path that traverses the unavailable link or node. An LSR along the path of the new LSP would detect the failed link or node, and may send an error message indicating that the new LSP cannot be established as requested.

SUMMARY

In general, techniques are described for establishing a label switched path (LSP) that allow the LSP to be signaled even though one or more resources along a primary path of the LSP has failed and are not currently available. As described, the signaling techniques may leverage the fact that the failed resource is protected by an existing MPLS fast reroute bypass tunnel. A protocol for signaling LSPs, such as Resource Reservation Protocol with Traffic Engineering extensions (RSVP-TE), is extended as described herein to allow signaling of the LSP to proceed using the bypass tunnel. In this manner, the LSP can still be established and traffic can be sent along the newly-established LSP through the bypass tunnel.

The techniques of this disclosure may provide one or more advantages. For example, the techniques may take advantage of MPLS fast reroute capabilities of a routing device along the primary path, and the fact that state for an MPLS fast reroute bypass tunnel is already configured in a data plane of the routing device. This allows the routing device to proceed with signaling of a new explicitly-routed LSP for the primary path even where a failure exists along the primary path of the explicitly-routed LSP that would otherwise result in failure of the signaling mechanism necessary for establishing the explicitly-routed LSP. Moreover, once the LSP is established, the routing device may employ MPLS label stacking techniques to automatically tunnel network traffic of the new LSP through the bypass tunnel.

In this manner, the extensions to a protocol described herein may leverage MPLS fast reroute capabilities for an existing LSP and automatically set up control plane and data plane state for rerouting the new LSP through an existing bypass tunnel at the time of initial establishment of the new LSP. Further, the extended protocol may set up the control plane and data plane state of the routing device as if the LSP being created were first established over the explicitly-routed path and then later re-routed through the bypass tunnel. This allows the LSP to revert to the primary path using MPLS fast reroute procedures when the failed resource along the primary path is restored.

In one aspect, a method includes while establishing an LSP within a network, identifying, with a network device, a failed resource along a primary path of the LSP. The method further includes, in response to identifying the failed resource, determining, with the network device, whether a bypass tunnel exists from the network device to a node along the primary path, wherein the bypass tunnel avoids the failed resource, and upon determining that the bypass tunnel exists, tunneling a message for establishing the LSP to the node over the bypass tunnel.

In another aspect, a network device includes a hardware-based processor and a RSVP-TE module executing on the hardware-based processor, wherein while establishing an LSP within a network, the RSVP-TE module identifies a failed resource along a primary path of the LSP, wherein the RSVP-TE module determines, in response to identifying the failed resource, whether a bypass tunnel exists from the network device to a node along the primary path, wherein the bypass tunnel avoids the failed resource, and wherein, upon determining that the bypass tunnel exists, the RSVP-TE module tunnels a PATH message for establishing the LSP to the node over the bypass tunnel.

In another aspect, a computer-readable storage medium includes instructions for causing a programmable processor to while establishing an LSP within a network, identify a failed resource along a primary path of the LSP, and in response to identifying the failed resource, determine whether a bypass tunnel exists from the network device to a node along the primary path, wherein the bypass tunnel avoids the failed resource. The instructions further include instructions to, upon determining that the bypass tunnel exists, tunnel a message for establishing the LSP to the node over the bypass tunnel.

The details of one or more examples are set forth in the accompanying drawings and the description below. Other features, objects, and advantages will be apparent from the description and drawings, and from the claims.

DETAILED DESCRIPTION

Figure 1:
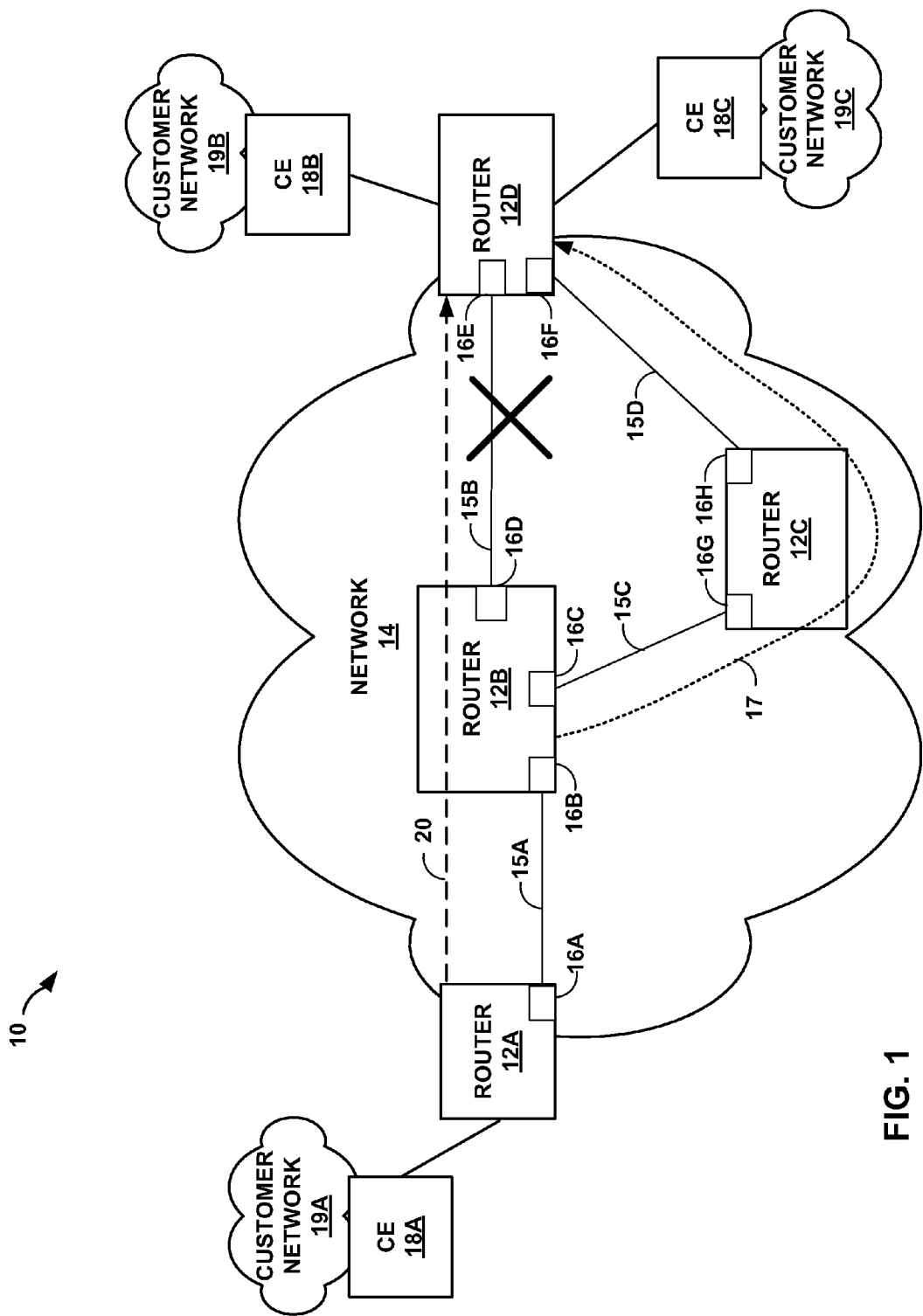
FIG. 1 is a block diagram illustrating an example system in which routers are configured to forward network traffic in accordance with the techniques of this disclosure.

FIG. 1 is a block diagram illustrating an example system 10 in which routers 12A-12D ("routers 12") of network 14 are configured to forward network traffic (e.g., network packets) in accordance with the techniques of this disclosure. In the illustrated example of FIG. 1, routers 12A and 12D are edge routers of a network 14, which may be administered by a network service provider, and provide connectivity for customer networks 19A-19C ("customer networks 19"). In particular, edge routers 12A and 12D are coupled to customer edge (CE) routers 18A-18C ("CE routers 18") of customer networks 19 via access links. Edge routers 12A and 12D communicate with CE routers 18 to provide customer networks 19 with access to network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Customer networks 19 may be viewed as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, routers 12A-12D are connected to one another by physical links 15A-15D ("links 15") coupled to routers 12A-12D by interface ports 16A-16H ("interface ports 16"). The physical links 15 may be a physical medium, such as a copper wire, a coaxial cable, any of a host of different fiber optic lines, or a wireless connection. Interface ports 16 may each be associated with a different identifier, such as an Internet Protocol (IP) address. For example, interface port 16E of router 12D may be associated with a first IP address, while interface port 16F of router 12D is associated with a second IP address different from the first IP address.

In order to maintain an accurate representation of the network 14, routers 12 exchange routing information using control-plane signaling in accordance with one or more defined protocols, such as the Border Gateway Protocol (BGP). When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two of routers 12 initially connect, they typically exchange their routing information. The routers 12 send control messages to incrementally update the routing information when the network topology changes. For example, the routers 12 may send update routing protocol messages to advertise newly available routes and to withdraw routes that are no longer available. Routers 12 may maintain the routing information in the form of one or more routing tables or other data structures. The form and contents of the routing tables depends on the routing algorithm implemented by the routers 12. Furthermore, as described in further detail below, routers 12 generate and maintain forwarding information in accordance with the routing information. The forwarding information associates network routes with specific forwarding next hops and corresponding interface ports of the router 12. The forwarding information may, therefore, be thought of as a subset of the information contained within routing information. The process of generating the forwarding information is generally referred to as route resolution.

In the example of FIG. 1, an MPLS fast reroute bypass tunnel 17 exists over routers 12B, 12C, and 12D. Bypass tunnel 17 is a label switched path (LSP) that provides link protection for link 15B between router 12B and router 12D, such that if link 15B should fail, router 12B can tunnel network traffic from an existing LSP through bypass tunnel 17. Router 12B establishes bypass tunnel 17 in accordance with MPLS fast reroute techniques, as described in P. Pan, Fast Reroute Extensions to RSVP-TE for LSP Tunnels, Network Working Group RFC 4090, May 2005, the entire content of which is incorporated by reference herein.

For example, as the point of local repair (PLR) and ingress of bypass tunnel 17, router 12B may establish bypass tunnel 17 to protect one or more other existing LSPs that traverse at least router 12B and router 12D and do not traverse links 15C and 15D. Router 12B may establish bypass tunnel 17 upon request by an ingress router of one of these protected LSPs. After router 12B establishes bypass tunnel 17, router 12B maintains forwarding information in a data plane of router 12B that allows router 12B to send traffic through bypass tunnel 17 if link 15B fails. In some aspects, bypass tunnel 17 may exist in the absence of any existing LSP protected by bypass tunnel 17. As one example, router 12B may be configured not to tear down bypass tunnel 17 for some time period after taking down the last protected LSP using bypass tunnel 17, so that if another LSP is established within the time period, and this other LSP would desire protection by bypass tunnel 17, it is not necessary to re-establish bypass tunnel 17 anew. For at least this configured time period, bypass tunnel 17 may exist without an associated protected LSP also existing at the same time.

In accordance with aspects of this disclosure, router 12A operates as an ingress router to initiate establishment of an explicitly-routed LSP 20, e.g., using the Resource Reservation Protocol with Traffic-Engineering Extensions (RSVP-TE). As one example, router 12A may be establishing the LSP 20 to carry L2 communications from customer network 19A to customer networks 19B, 19C in the form of MPLS packets that enter LSP 20 at ingress router 12A and exit the LSPs at egress router 12D. LSP 20 will be a new LSP other than the already-established LSPs protected by bypass tunnel 17.

In one example, to initiate setup of LSP 20, router 12A may generate an RSVP-TE PATH message that specifies a path for the desired explicitly-routed LSP 20 in an Explicit Route Object (ERO) of the PATH message. The PATH message is a resource request message that requests resources to be reserved on the specified path. In this example, router 12A selects an explicit route for LSP 20 along a path from router 12A to router 12B (over link 15A) to router 12D (over link 15B), where router 12D is to be the egress of LSP 20. The ERO of the PATH message sent by router 12A would therefore specify [16B, 16E], e.g., sub-objects consisting of IP addresses associated with interface ports 16B and 16E. As the ingress router of LSP 20, router 12A also specifies within the PATH message whether router 12A desires MPLS fast reroute link protection, node protection, or both. Router 12A sends the PATH message over link 15A to router 12B.

When router 12B receives the PATH message from router 12A on interface port 16B, router 12B does a route lookup of the address of interface port 16E specified in the ERO, to determine an interface port on which to output the PATH message toward 16E. Based on the route lookup, router 12B identifies interface port 16D as the interface port on which to output the PATH message, but also identifies that, in this example, the link 15B coupled to interface port 16D is currently unavailable (e.g., has failed).

In the absence of the extensions to RSVP-TE described herein, router 12B would simply return a PathErr message to router 12A at this point, and signaling of the LSP 20 would fail. In accordance with the techniques of this disclosure, however, router 12B executes an extended RSVP-TE module that is configured to first examine the forwarding information of router 12B to determine whether any bypass tunnel is already established from router 12B to the next hop along the requested path associated with interface port 16E, i.e., router 12D, and which avoids the failed resource along that path. In the example of FIG. 1, router 12B determines that such a bypass tunnel 17 exists to router 12D. Because, in this example, bypass tunnel 17 has already been established for a different LSP, router 12B proceeds to modify the ERO of the PATH message for requested LSP 20 to specify interface port 16F rather than 16E, and tunnels the modified PATH message through bypass tunnel 17. In this manner, even though a resource is unavailable on the explicitly-routed path specified by the ingress router for forming LSP 20, router 12B continues with signaling for establishing the LSP 20, sending the PATH message on bypass tunnel 17 through router 12C in a manner that bypasses the failed link 15B.

Router 12D receives the modified PATH message on interface port 16F, and generates an RSVP-TE RESV message in response to the PATH message. The RESV message is a resource reservation message that indicates resources have been reserved in accordance with the PATH message, and includes an MPLS label for LSP 20 allocated by router 12D. Router 12D routes the RESV message to router 12B. Router 12B receives the RESV message, updates forwarding information based on contents of the RESV message, and forwards the RESV message to the ingress router 12A of the LSP 20. Router 12B also sends a message to router 12A indicating that LSP 20 has been locally repaired using an MPLS fast reroute bypass tunnel. This makes router 12A aware of the fact that the path on which LSP 20 is established deviates from the explicitly-routed path that had been specified by router 12A, and allows router 12A the option of re-routing LSP 20 if router 12A so chooses, e.g., along a more optimal path.

If the network resource that had been down (in this example link 15B) later becomes operable, router 12B may detect this change, and re-signal the portion of LSP 20 that was tunneled through bypass tunnel 17. For example, router 12B sends a new PATH message to router 12D over link 15B, where the new PATH message includes an ERO specifying interface port 16E. Router 12D sends a RESV message in response to the PATH message. Router 12D may generate the new RESV to include the same MPLS label previously allocated for LSP 20, to avoid traffic disruption during reversion. Router 12B receives the RESV message and sends a new RESV message to router 12A. In this manner, LSP 20 can be re-signaled to follow the primary path from router 12A to router 12B to router 12D.

In the example described above, router 12B is an intermediate LSR on the LSP 20 being established. In other aspects, the techniques may be performed by the ingress router of an LSP being established, where the ingress router is a PLR of a bypass tunnel. If the router is an ingress of the LSP 20 being established, then certain steps described above will be omitted, such as sending messages back to an ingress. In addition, the route lookup is done based on an ERO generated by the ingress itself for establishing the LSP rather than an ERO received via a PATH message from another LSR. In addition, while the example described above illustrates the merge point (MP) router 12D as the egress router of LSP 20, in other aspects the MP may be a transit (i.e., intermediate) router of LSP 20 rather than the egress router. In such examples, in the control plane the MP would continue to signal LSP 20 further downstream. In the data plane, the MP would pop the outer label (bypass label) and then swap the inner label (associated with LSP 20) with the label allocated by the downstream router.

The techniques described herein apply to a physical, hardware failure of a link 15 or of the interface ports connecting the link to a network device. In addition, the techniques described herein also apply in situations where an interface logically fails, although there may be no physical failure. For example, an operations and management (OAM) protocol running over an Ethernet link may be able to detect that an interface has logically gone down.

While the above example is described for purposes of illustration in the context of a link failure and a bypass tunnel that provides link protection, the techniques of this disclosure are also applicable in the context of a node failure and a bypass tunnel that provides node protection. That is, techniques described herein also apply to situations in which one of routers 12 becomes unavailable. For example, in another configuration of network 14, there may be an additional intermediate router 12 (not shown) between router 12B and router 12D. In this case, bypass tunnel 17 would provide node protection in case the intermediate router was unavailable.

Further, while the above example is described for purposes of illustration as applied to establishment of a point-to-point (P2P) LSP, the techniques of this disclosure may also be applied to establishment of point-to-multipoint (P2MP) LSPs. Fast reroute for P2MP LSPs is described in application Ser. No. 11/056,383, filed on Feb. 10, 2005, entitled FAST REROUTE OF TRAFFIC ASSOCIATED WITH A POINT TO MULTI-POINT NETWORK TUNNEL, the entire contents of which is incorporated herein by reference.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1. As another example, router 12B may be associated with a greater number of LSPs than shown in FIG. 1.

Figure 2:
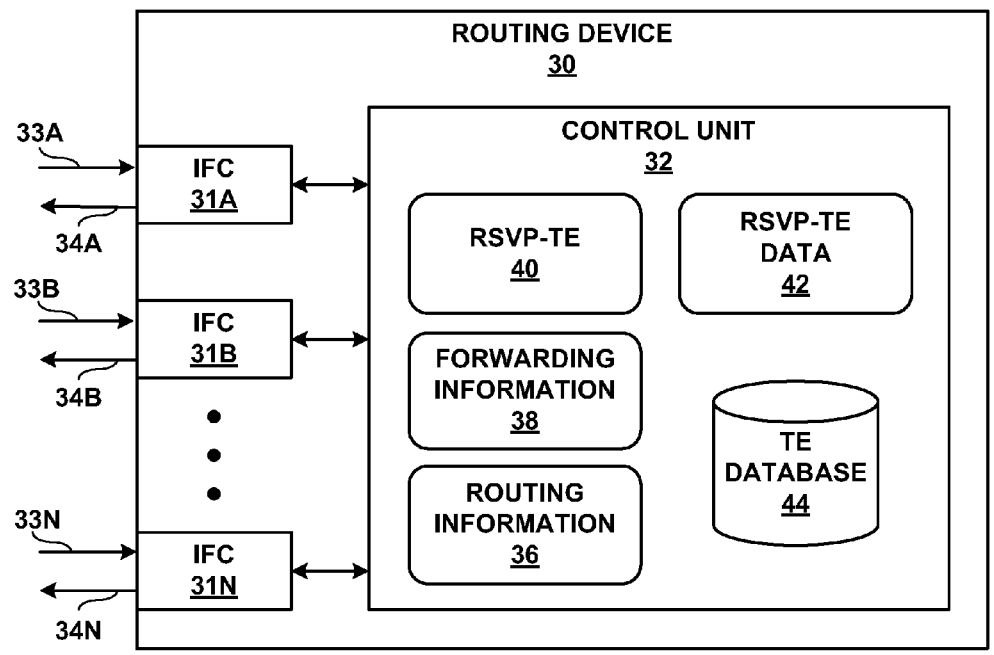
FIG. 2 is a block diagram illustrating an example embodiment of a routing device in accordance with the techniques of this disclosure.

FIG. 2 is a block diagram illustrating an example embodiment of a routing device 30 in accordance with the techniques of this disclosure. Routing device 30 uses a protocol that has been extended as described herein to use an MPLS fast reroute bypass tunnel during the establishment of an LSP. Routing device 30 may, for example, represent any of the routers described herein, such as routers 12 of FIG. 1. Routing device 30 may, for example, be an ingress router or an intermediate LSR of the LSP being established. Routing device 30 may comprise a point of local repair for the LSP being established, and an ingress router associated with the bypass tunnel.

In the example embodiment of FIG. 2, routing device 30 includes a set of interface cards (IFCs) 31A-31N ("IFCs 31") for communicating packets via inbound links 33A-33N ("inbound links 33") and outbound links 34A-34N ("outbound links 34"). Inbound links 33 and outbound links 34 are physical links coupled physical interfaces of routing device 30. Routing device 30 further includes a control unit 32 that maintains routing information 36. Routing information 36 describes the topology of a network and, in particular, routes through the network. Routing information 36 may include, for example, route data that describes various routes within the network, and corresponding next hop data indicating appropriate neighboring devices within the network for each of the routes. Routing device 30 updates routing information 36 to accurately reflect the topology of the network.

Routing device 30 generates and maintains forwarding information 38 in accordance with routing information 36. Forwarding information 38 associates network routes with specific forwarding next hops and corresponding interface ports of the router 12. Forwarding information 38 may, therefore, be thought of as a subset of the information contained within routing information 36. Forwarding information 38 may also include labels for use in forwarding MPLS packets along LSPs and tunneling LSPs through bypass tunnels. In general, when routing device 30 receives a packet via one of inbound links 33, control unit 32 determines a destination and associated next hop for the packet in accordance with forwarding information 38 and outputs the packet on one of outbound links 34 based on the destination.

In the example of FIG. 2, control unit 32 provides an operating environment for a resource reservation protocol module 40 ("RSVP-TE module 40") executing within control unit 32. In some aspects, other protocols may alternatively or additionally be executed within control unit 32, such as the label distribution protocol (LDP), routing protocols such as an interior gateway protocol, the Border Gateway Protocol, or other protocols. RSVP-TE module 40 receives resource reservation requests from other routing devices, and reserves the requested bandwidth on outbound links 34 for RSVP-TE traffic. Although described for exemplary purposes in reference to RSVP-TE, the principles described herein may be applied to extend other protocols, such as other protocols for label distribution and/or traffic engineering.

RSVP-TE module 40 has been extended as described herein to support the use of MPLS fast reroute bypass tunnels, where available, during initial setup of an LSP. Consistent with the principles of the invention, RSVP-TE module 40 provides signaling mechanisms for tunneling an LSP through a bypass tunnel while the LSP is being initially established. In certain embodiments, the operations may be carried out automatically, i.e., without intervention by a system administrator or a software agent. By taking advantage of MPLS label stacking and MPLS fast reroute capabilities of routing device 30, routing device 30 uses the pre-established bypass tunnel for signaling setup of the LSP 20 when LSP 20 is initially being established but a resource along the primary path for setting up LSP 20 has failed.

RSVP-TE module 40 may receive an indication that an initial LSP is to be established, such as by receiving an RSVP-TE PATH message from an ingress or other upstream LSR, or by receiving configuration from an administrator that routing device 30 is to be an ingress LSR of the LSP 20 to be established. RSVP-TE module 40 extracts an ERO from the PATH message or, when routing device 30 is the ingress, generates an ERO itself. Based on the ERO, RSVP-TE module 40 does a lookup in forwarding information 38 to determine an interface port on which to output a PATH message to the next LSR on the path specified in the ERO, for setting up the LSP 20. RSVP-TE module 40 may also do a lookup of traffic engineering information in traffic engineering database (TED) 44. Based on the lookup(s), RSVP-TE module 40 determines whether a failure exists on a link or node associated with the interface port.

When RSVP-TE module 40 determines that a failure does exist on the path of LSP 20, rather than immediately determining that signaling of LSP 20 has failed, RSVP-TE module 40 is configured to first check whether a bypass tunnel that avoids the failure along the explicitly-routed path for the new LSP exists. If RSVP-TE module 40 determines that a bypass tunnel to router 12D does not already exist as protection of a different, existing LSP, RSVP-TE module 40 may send a PathErr message to the ingress, indicating that signaling of newly requested LSP 20 has failed. If RSVP-TE module 40 determines that a bypass tunnel that avoids the failure exists, RSVP-TE module 40 sends a PATH message for LSP 20 to the merge point by tunneling the PATH message through the bypass tunnel. Specifically, RSVP-TE module 40 adds an MPLS label associated with the bypass tunnel to the PATH message, and tunnels the PATH message through the bypass tunnel.

Before tunneling the PATH message through the bypass tunnel, RSVP-TE module 40 modifies the ERO of the PATH message to remove all sub-objects belonging to nodes that precede the merge point, along with the first sub-object belonging to the merge point. RSVP-TE module 40 then adds a sub-object identifying the backup tunnel destination. This allows the merge point of the bypass tunnel to correctly process the ERO of PATH message.

In response to the PATH message, routing device 30 receives a RESV message from the merge point, and RSVP-TE module 40 stores data from the RESV message for LSP 20 in RSVP-TE data 42. For example, RSVP-TE module 40 stores a MPLS label, provided by the merge point in the RESV message, to be used for sending traffic on LSP 20. RSVP-TE module 40 may also store MPLS fast reroute objects from the RESV message.

RSVP-TE module 40 may generate a RESV message that routing device 30 sends to the ingress router. RSVP-TE module 40 allocates an MPLS label for LSP 20, and includes the MPLS label in the RESV message. RSVP-TE module 40 inserts into a Route Record Object (RRO) of the RESV message an IPv4 or IPv6 sub-object having the "Local protection in use" and "Local Protection Available" flags set. RSVP-TE module 40 also sends a PathErr message that notifies the ingress router that LSP 20 has been locally repaired.

In this manner, routing device 30 uses its MPLS fast reroute capabilities and the extensions to RSVP-TE described herein to set up its control plane and data plane state for rerouting the new LSP 20 through bypass tunnel 17 at the time of initial establishment of LSP 20 in the same manner as routing device 30 would have set up the state if LSP 20 were first established over the explicitly-routed path and then later re-routed through bypass tunnel 17.

The architecture of routing device 30 illustrated in FIG. 2 is shown for exemplary purposes only. The disclosure is not limited to this architecture. In other examples, routing device 30 may be configured in a variety of ways. In one embodiment, for example, control unit 32 and its corresponding functionality may be distributed within IFCs 92. In another example, control unit 32 may include a routing component that performs routing functions and maintains a routing information base (RIB), e.g., routing information 36, and a forwarding component that performs packet forwarding based on a forwarding information base (FIB), e.g., forwarding information 38, generated in accordance with the RIB.

Control unit 32 may be implemented solely in software, or hardware, or may be implemented as a combination of software, hardware, or firmware. For example, control unit 32 may include one or more hardware-based processors which execute software instructions. In that case, the various software modules of control unit 32, such as RSVP-TE module 40, may comprise executable instructions stored on a computer-readable storage medium, such as computer memory or hard disk.

Figure 3:
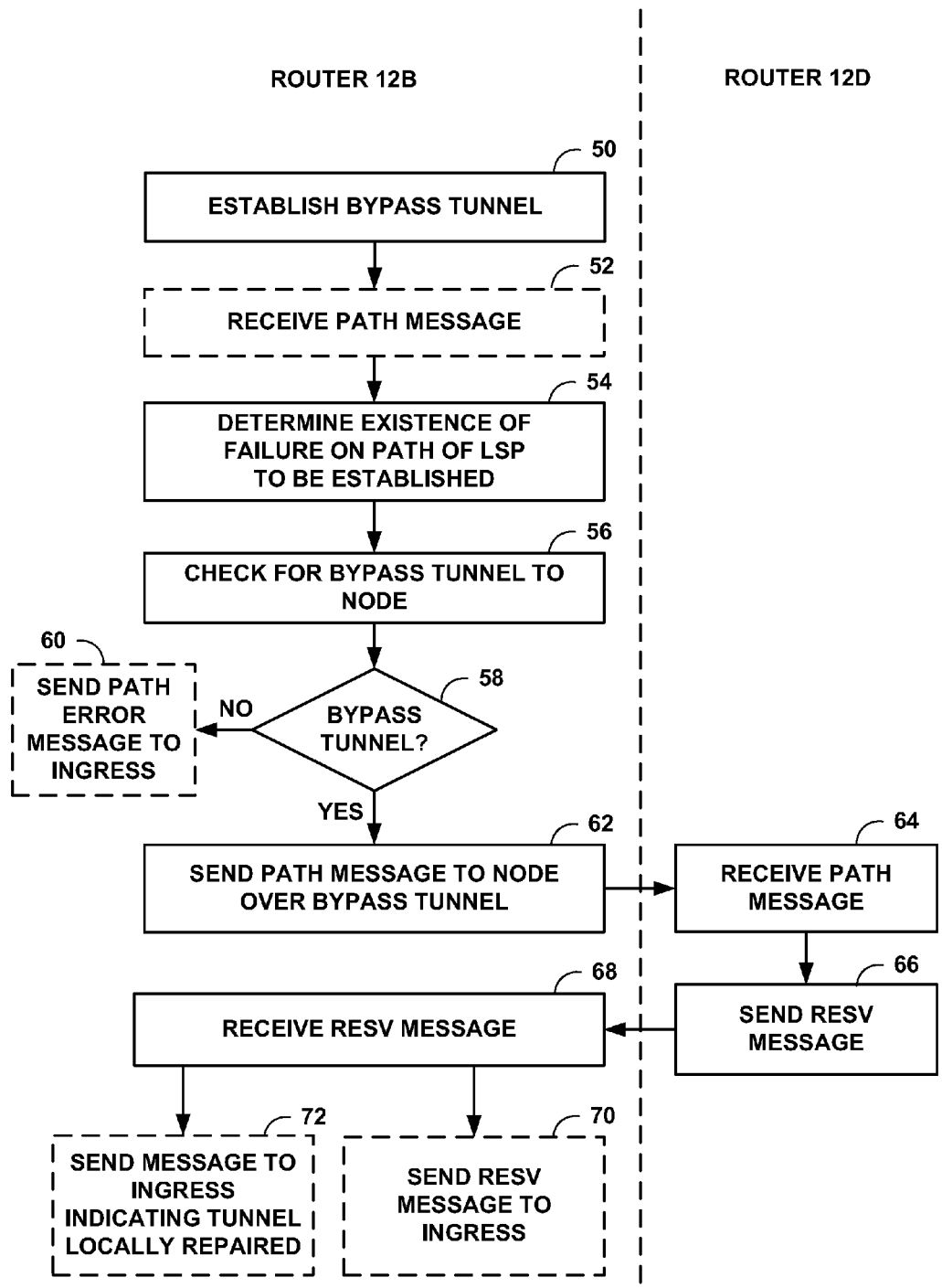
FIG. 3 is a flowchart illustrating example operation of network devices in accordance with the techniques of this disclosure.

FIG. 3 is a flowchart illustrating example operation of network devices in accordance with the techniques of this disclosure. For purposes of example, FIG. 3 will be described with reference to routers 12B and 12C of FIG. 1, and routing device 30 of FIG. 2. Although FIG. 3 is described for purposes for illustration with respect to a PLR router that is not also the ingress of the LSP 20 being set up, the techniques may be also applied to a PLR that is the ingress of the LSP 20. In the case where the PLR is the ingress of LSP 20, the steps of FIG. 3 shown in dashed lines would be omitted.

In the example of FIG. 3, router 12B establishes a bypass tunnel, such as bypass tunnel 17 of FIG. 1 (50). For example, router 12B may establish bypass tunnel 17 to protect one or more already-existing LSPs that traverse router 12B, link 15B, and router 12D. Router 12B may establish bypass tunnel 17 upon request by an ingress router of one of these protected LSPs. After router 12B establishes bypass tunnel 17, router 12B maintains forwarding information in a data plane of router 12B that allows router 12B to send traffic through bypass tunnel 17 if link 15B fails. Router 12B may compute the path for the bypass tunnel 17, or a user may statically configure bypass tunnel 17 at router 12B.

In this example, router 12B receives a PATH message from an ingress router for establishing a new LSP 20 (52), e.g., from router 12A. The PATH message may be an RSVP-TE PATH message that specifies a path for the desired explicitly-routed LSP 20 in an Explicit Route Object (ERO) of the PATH message. In this example, the ERO of the PATH message sent by router 12A specifies [16B, 16E], e.g., IP addresses associated with interface ports 16B and 16E of routers 12B, 12D, respectively. The PATH message may have a "Local protection desired" flag set that permits transit routers of LSP 20 to use a local repair mechanism that may result in violation of the ERO. When router 12B receives the PATH message from router 12A on interface port 16B, router 12B does a lookup in forwarding information 38, using the address of interface port 16E specified in the ERO as a key. Based on the lookup, router 12B determines an interface port on which to output the PATH message toward 16E, and also determines whether a failure exists on a link or node associated with the interface port (54). In this example, RSVP-TE module 40 determines that a failure does exist on the path of LSP 20. In this case, the failure lies with link 15B on the path to router 12D.

When router 12B determines that a failure does exist on the path of LSP 20, rather than immediately sending a message back to router 12A that signaling of LSP 20 has failed, RSVP-TE module 40 of router 12B first checks whether a bypass tunnel exists that avoids the failure (56). If router 12B determines that a bypass tunnel to router 12D does not exist (NO branch of 58), router 12B sends a Path Error message to router 12A (e.g., a PathErr message), indicating that signaling of LSP 20 has failed. If router 12B determines that a bypass tunnel to router 12D exists (YES branch of 58), router 12B sends a PATH message for LSP 20 to the next node by tunneling the PATH message through the bypass tunnel (62). In the example of FIG. 1, router 12B does determine that bypass tunnel 17 exists to router 12D, and tunnels the PATH message through bypass tunnel 17. That is, router 12B may encapsulate the PATH message in an MPLS packet having an MPLS label associated with the LSP of bypass tunnel 17, and sends the encapsulated PATH message along the LSP that is bypass tunnel 17. The LSRs of bypass tunnel 17 use MPLS label switching to forward the PATH message along bypass tunnel 17 to router 12D.

Before tunneling the PATH message through the bypass tunnel, router 12B modifies the ERO of the PATH message to remove all sub-objects belonging to nodes that precede the merge point, along with the first sub-object belonging to the merge point. Router 12B then adds a sub-object identifying the backup tunnel destination. In the current example, router 12B removes the sub-object associated with interface port 16B of router 12B, removes the sub-object of the ERO associated with the merge point (here, router 12D), i.e., an IP address of interface port 16E of router 12D, replacing this sub-object with an IP address of interface port 16F of router 12D. This allows the merge point of the bypass tunnel to correctly process the ERO of PATH message.

Router 12D receives the PATH message on bypass tunnel 17 (64), and RSVP-TE module 40 of router 12D removes the MPLS label associated with bypass tunnel 17. Router 12D may store data from the PATH message in its RSVP-TE data 42. RSVP-TE module 40 of router 12D generates a corresponding RESV message to reserve the resources requested by the PATH message for LSP 20. RSVP-TE module 40 of router 12D allocates an MPLS label for LSP 20, and includes the MPLS label in the RESV message. Router 12D sends the RESV message to router 12B (66). In an alternate example in which router 12D is a transit router of LSP 20, router 12D would continue to signal LSP 20 downstream by sending a PATH message to the next downstream LSR. Router 12B receives the RESV message from router 12B (68), and RSVP-TE module 40 removes the outer MPLS label and stores data from the RESV message for LSP 20 in RSVP-TE data 42. For example, RSVP-TE module 40 of router 12B stores the MPLS label provided by router 12D for LSP 20. RSVP-TE module 40 may also store MPLS fast reroute objects from the RESV message.

RSVP-TE module 40 generates a RESV message that router 12B sends to router 12A (70). RSVP-TE module 40 of router 12B allocates an MPLS label for LSP 20, and includes the MPLS label in the RESV message. RSVP-TE module 40 inserts into a Route Record Object (RRO) of the RESV message an IPv4 or IPv6 sub-object having the "Local protection in use" and "Local Protection Available" flags set. RSVP-TE module 40 also sends a PathErr message that notifies ingress router 12A that LSP 20 has been locally repaired (72). This informs router 12A that LSP 20 is routed over bypass tunnel 17 so that router 12A has the opportunity to re-signal a different, more optimal path for LSP 20. Router 12A may additionally detect that LSP 20 should be re-signaled to a more optimal path by noticing the failure of link 15B as reported by an Interior Gateway Protocol (IGP).

Figure 4:
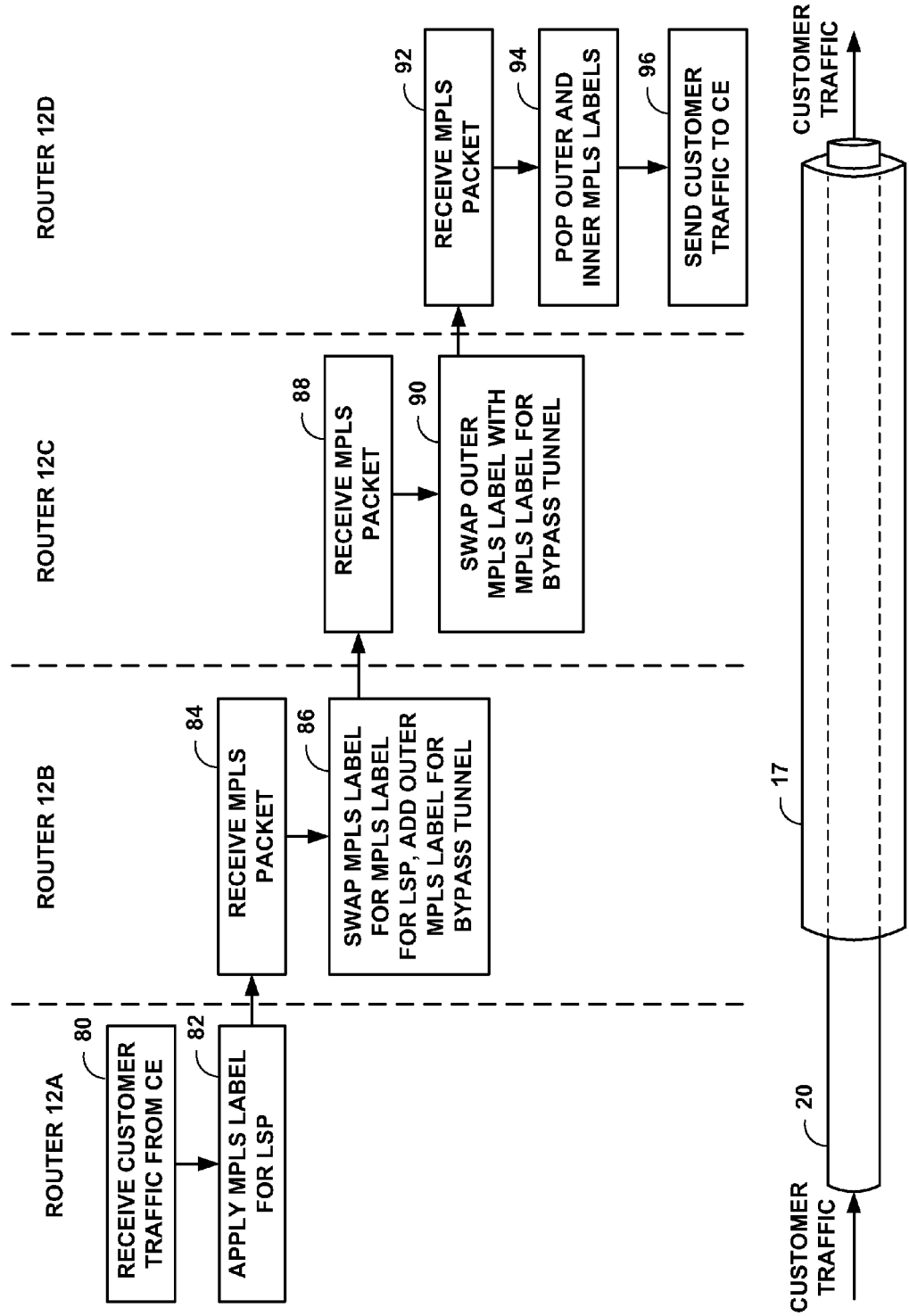
FIG. 4 is a flowchart and accompanying block diagram illustrating example operation of routers in forwarding network traffic over an LSP that was tunneled through a bypass tunnel when initially established.

FIG. 4 is a flowchart and accompanying block diagram illustrating example operation of routers in forwarding network traffic over LSP 20 that was tunneled through bypass tunnel 17 when initially established. After LSP 20 is established, router 12A can send network traffic, received from customer network 19A, over LSP 20 to customer networks 19B and/or 19C. Router 12A receives customer network traffic from CE router 18A (80), and router 12A applies the MPLS label, provided by router 12B in the RESV message, to the network traffic and sends the network traffic as MPLS packets to router 12B over LSP 20 (82). When router 12B receives the network traffic as MPLS packets having the MPLS label (84), router 12B accesses its forwarding information 38 and determines that router 12B should swap the MPLS label with a label stack, consisting of an inner label associated with LSP 20 (that was provided by router 12D in the RESV message) and an outer label associated with bypass tunnel 17, and tunnel the network traffic as MPLS packets through bypass tunnel 17 (86). Router 12B does so.

Router 12C, an intermediate LSR along bypass tunnel 17, receives the MPLS packets (88), looks up the outer MPLS label in its forwarding information, and determines router 12C should swap the outer MPLS label associated with bypass tunnel 17 for another MPLS label associated with bypass tunnel 17 and output the MPLS packets to router 12D (90). Router 12C does so. Router 12D receives the MPLS packet (92), and based on its forwarding information, determines that it should pop the outer and inner MPLS labels (94) and send the customer network traffic packets to one of CE router 18B or 18C based on the forwarding information (96).

In a further aspect, upon detecting that the failed resource (e.g., a link or a node) is restored, the PLR may re-signal LSP 20 using the local revertive mode of MPLS fast reroute techniques. In this example, when router 12B detects that link 15B is restored, router 12B generates a new PATH message having the original ERO sub-object that indicates interface port 16E of router 12D. Router 12B may generate the PATH message based on data that was earlier stored in RSVP-TE data 42, such as a FAST REROUTE object from the original PATH message received from router 12A. Router 12B outputs the new PATH message on link 15B to router 12D. Router 12D receives the PATH message and, in response, generates a new RESV message and sends the RESV message to router 12B on link 15B. Router 12D may generate the new RESV to include the same MPLS label previously allocated for LSP 20. Router 12B receives the new RESV message and updates forwarding information 38 and RSVP-TE data 42 to reflect that LSP 20 now follows a path to router 12D over link 15B and not over bypass tunnel 17. Router 12B sends a new RESV message to router 12A, and may set a "Local Protection Available" flag but may not set a "Local protection in use" flag of an RRO of the new RESV message. As a result of this re-signaling, traffic sent on LSP 20 now follows the primary path from router 12A to router 12B to router 12D, and is no longer tunneled through bypass tunnel 17.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
receiving, by a Resource Reservation Protocol with Traffic Engineering extensions (RSVP-TE) module executing on a processor of an intermediate network device positioned between an ingress node and an egress node in a network, a resource request message that requests to establish a label switched path (LSP) along a primary path from the ingress node to the egress node;
while establishing the LSP, identifying, by the intermediate network device, that a failed resource exists along the primary path of the LSP;
in response to identifying that the failed resource exists, determining, by the RSVP-TE module executing on a processor of the intermediate network device, whether a bypass tunnel exists from the intermediate network device to a bypass tunnel destination node along the primary path, wherein the bypass tunnel avoids the failed resource;
in response to determining that the bypass tunnel exists and by the RSVP-TE module of the intermediate network device, modifying the resource request message to request to establish the LSP to the egress node via the bypass tunnel destination node, encapsulating the modified resource request message with a Multiprotocol Label Switching (MPLS) label associated with the bypass tunnel, and outputting the encapsulated modified resource request message over the bypass tunnel to the bypass tunnel destination node; and
in response to receiving a resource reservation signaling message for the LSP from the bypass tunnel destination node indicating the LSP has been established, sending one or more communications from the intermediate network device toward the ingress node indicating the LSP to the egress node has been established and that the LSP has been rerouted through the bypass tunnel.

2. The method of claim 1, wherein the primary path is specified in an Explicit Route Object (ERO) of a message.

3. The method of claim 2, wherein the intermediate network device comprises an intermediate router along the primary path for the LSP,
wherein the ERO is received in a Resource Reservation Protocol with Traffic Engineering extensions (RSVP-TE) PATH message received by the network device, and wherein tunneling the message comprises tunneling an RSVP-TE PATH message over the bypass tunnel.

4. The method of claim 1, further comprising looking up a destination address of a next node along the primary path of the LSP in stored forwarding information and traffic engineering information, wherein identifying the failed resource comprises identifying the failed resource based on results of the lookup.

5. The method of claim 1, wherein the intermediate network device comprises a point of local repair (PLR) associated with the bypass tunnel, and wherein the bypass tunnel comprises a bypass tunnel used by the PLR in providing another existing LSP with MPLS fast reroute protection.

6. The method of claim 1, further comprising:
receiving the resource reservation signaling message for the LSP from the bypass tunnel destination node in response to the tunneled modified resource request message, wherein the resource reservation signaling message indicates that requested network resources are reserved and specifies a MPLS label to use for sending network traffic along the LSP.

7. The method of claim 1, wherein sending one or more communications comprises:
in response to receiving the resource reservation signaling message, sending a resource reservation signaling message from the intermediate network device toward the ingress node of the LSP indicating that signaling for the LSP has failed.

8. The method of claim 1, further comprising:
after establishing the LSP using the bypass tunnel, receiving a packet to be forwarded along the LSP; and
applying a label stack to the packet, wherein the label stack comprises an inner Multiprotocol Label Switching (MPLS) label associated with the LSP and the MPLS label associated with the bypass tunnel as an outer label, and outputting the packet as an MPLS packet over the bypass tunnel.

9. The method of claim 1, further comprising:
detecting, with the intermediate network device, that the failed resource along the primary path has become operable; and
in response to detecting that the failed resource is operable, sending, by the intermediate network device, a new resource request message that requests to establish the LSP over the primary path.

10. The method of claim 1, further comprising:
in response to determining that the bypass tunnel does not exist and by the intermediate network device, sending a path error message to the ingress node of the LSP indicating that signaling for the LSP has failed.

11. The method of claim 1, wherein the failed resource comprises one of a failed link along the primary path and a failed node along the primary path.

12. The method of claim 1, wherein the LSP comprises a point-to-point (P2P) LSP.

13. The method of claim 1, wherein the LSP comprises a point-to-multipoint (P2MP) LSP.

14. The method of claim 1, further comprising:
receiving the resource reservation signaling message for the LSP from the bypass tunnel destination node in response to the tunneled modified resource request message, wherein the resource reservation message specifies a MPLS label to use for sending network traffic along the LSP; and
in response to receiving the resource reservation message for the LSP, installing data plane state to the intermediate network device as if for re-routing the LSP being established through the bypass tunnel, wherein the data plane state includes the MPLS label.

15. A network device comprising:
a hardware-based processor; and
a Resource Reservation Protocol with Traffic Engineering extensions (RSVP-TE) module executing on the hardware-based processor,
wherein the RSVP-TE module receives a resource request message that requests to establish a label switched path (LSP) along a primary path from an ingress node to an egress node, wherein the network device is an intermediate network device positioned between the ingress node and the egress node,
wherein while establishing the LSP, the RSVP-TE module identifies that a failed resource exists along the primary path of the LSP,
wherein the RSVP-TE module determines, in response to identifying that the failed resource exists, whether a bypass tunnel exists from the intermediate network device to a bypass tunnel destination node along the primary path, wherein the bypass tunnel avoids the failed resource, and
wherein, in response to determining that the bypass tunnel exists, the RSVP-TE module modifies the resource request message to request to establish the LSP to the egress node via the bypass tunnel destination node, encapsulates the modified resource request message with a Multiprotocol Label Switching (MPLS) label associated with the bypass tunnel, and outputs the encapsulated modified resource request message over the bypass tunnel to the bypass tunnel destination node, and
wherein, in response to receiving a resource reservation signaling message for the LSP from the bypass tunnel destination node indicating the LSP has been established, the RSVP-TE module sends one or more communications from the intermediate network device toward the ingress node indicating the LSP to the egress node has been established and that the LSP has been rerouted through the bypass tunnel.

16. The network device of claim 15, wherein the network device comprises a point of local repair (PLR) associated with the bypass tunnel, and wherein the bypass tunnel comprises a bypass tunnel used by the PLR in providing another existing LSP with Multiprotocol Label Switching (MPLS) fast reroute protection.

17. The network device of claim 15, wherein the RSVP-TE module sending one or more communications toward the ingress nodes comprises:
in response to receiving a resource reservation signaling message from the node, the RSVP-TE module sends a resource reservation signaling message toward primary path of the LSP;
in response to identifying that the failed resource exists, determine whether a bypass tunnel exists from the intermediate network device to a node along the primary path, wherein the bypass tunnel avoids the failed resource;
in response to determining that the bypass tunnel exists, modify the resource request message to request to establish the LSP to the egress node via the bypass tunnel destination node, encapsulate the modified resource request message with a Multiprotocol Label Switching (MPLS) label associated with the bypass tunnel, and output the encapsulated modified resource request message over the bypass tunnel to the bypass tunnel destination node; and
in response to receiving a resource reservation signaling message for the LSP from the bypass tunnel destination node indicating the LSP has been established, send one or more communications from the intermediate network device toward the ingress node indicating the LSP to the egress node has been established and that the LSP has been rerouted through the bypass tunnel.

18. The network device of claim 15,
wherein, after the RSVP-TE module has established the LSP using the bypass tunnel, the network device receives a packet to be forwarded along the LSP, and
wherein the RSVP-TE module applies a label stack to the received packet, wherein the label stack comprises an inner MPLS label associated with the LSP and the MPLS label associated with the bypass tunnel as an outer label, and outputting the packet as an MPLS packet over the bypass tunnel.

19. A non-transitory computer-readable storage medium comprising instructions for causing a programmable processor of an intermediate network device positioned between an ingress node and an egress node in a network to:
receive, by a Resource Reservation Protocol with Traffic Engineering extensions (RSVP-TE) module executing on the programmable processor, a resource request message that requests to establish a label switched path (LSP) along a primary path from the ingress node to the egress node;
while establishing the LSP within a network, identify that a failed resource exists along the primary path of the LSP;
in response to identifying that the failed resource exists, determine, by the RSVP-TE module executing on the programmable processor, whether a bypass tunnel exists from the intermediate network device to a node along the primary path, wherein the bypass tunnel avoids the failed resource;
in response to determining that the bypass tunnel exists and by the RSVP-TE module, modify the resource request message to request to establish the LSP to the egress node via the bypass tunnel destination node, encapsulate the modified resource request message with a Multiprotocol Label Switching (MPLS) label associated with the bypass tunnel, and output the encapsulated modified resource request message over the bypass tunnel to the bypass tunnel destination node; and
in response to receiving a resource reservation signaling message for the LSP from the bypass tunnel destination node indicating the LSP has been established, send one or more communications from the intermediate network device toward the ingress node indicating the LSP to the egress node has been established and that the LSP has been rerouted through the bypass tunnel.

* * * * *